United States Patent
Shavrnoch et al.

(10) Patent No.: US 10,981,593 B2
(45) Date of Patent: Apr. 20, 2021

(54) NYLON RESIN DRIVEN PULLEY

(71) Applicant: Steering Solutions IP Holding Corporation, Saginaw, MA (US)

(72) Inventors: James J. Shavrnoch, Frankenmuth, MI (US); Troy P. Strieter, Sebewaing, MI (US); Tony M. Dodak, Montrose, MI (US); Jeffrey M. Otto, Bay City, MI (US); Conrad G. Vorwerck, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/705,995

(22) Filed: Dec. 6, 2019

(65) Prior Publication Data

US 2020/0108855 A1 Apr. 9, 2020

Related U.S. Application Data

(62) Division of application No. 15/465,817, filed on Mar. 22, 2017, now Pat. No. 10,526,006, which is a
(Continued)

(51) Int. Cl.
*B62D 5/04* (2006.01)
*F16H 55/48* (2006.01)
(Continued)

(52) U.S. Cl.
CPC .......... *B62D 5/0448* (2013.01); *B62D 5/0424* (2013.01); *F16H 25/2204* (2013.01);
(Continued)

(58) Field of Classification Search
CPC . B62D 5/0448; B62D 5/0424; F16H 25/2214; F16H 55/171; F16H 25/2204;
(Continued)

(56) References Cited

U.S. PATENT DOCUMENTS

| 4,195,862 A | 4/1980 | Specktor |
| 8,496,552 B2 | 7/2013 | Kvasnicka et al. |

(Continued)

FOREIGN PATENT DOCUMENTS

| CN | 202392057 U | 8/2012 | |
| DE | 102007049114 A1 * | 4/2009 | ............. F16H 55/36 |

(Continued)

OTHER PUBLICATIONS

Chinese Office Action for Chinese Application No. 201310596461.5 dated Aug. 27, 2015.
(Continued)

*Primary Examiner* — Tony H Winner
*Assistant Examiner* — Felicia L. Brittman
(74) *Attorney, Agent, or Firm* — Dickinson Wright PLLC

(57) ABSTRACT

A method of fabricating a ball nut assembly is provided. The method includes providing a ball nut having a keyway slot. The method also includes forming a polymer pulley having an inner surface defining a bore, a cut-out formed in the inner surface, and a torque member extending radially inward from the inner surface, wherein the keyway slot is configured to receive the torque member therein.

4 Claims, 4 Drawing Sheets

Related U.S. Application Data division of application No. 14/038,976, filed on Sep. 27, 2013, now Pat. No. 9,637,164.

(60) Provisional application No. 61/707,117, filed on Sep. 28, 2012.

(51) Int. Cl.
*F16H 25/22* (2006.01)
*F16H 55/17* (2006.01)
F16H 25/20 (2006.01)
F16H 55/06 (2006.01)

(52) U.S. Cl.
CPC ....... *F16H 25/2214* (2013.01); *F16H 55/171* (2013.01); *F16H 55/48* (2013.01); *F16H 55/06* (2013.01); *F16H 2025/2081* (2013.01); *F16H 2025/2096* (2013.01)

(58) Field of Classification Search
CPC .. F16H 55/48; F16H 55/06; F16H 2025/2081; F16H 2025/2096
USPC ........................................................ 180/444
See application file for complete search history.

(56) References Cited

U.S. PATENT DOCUMENTS

| | | |
|---|---|---|
| 8,997,597 B2 | 4/2015 | Rupp et al. |
| 2011/0167940 A1 | 7/2011 | Shavrnoch et al. |
| 2011/0220432 A1 | 9/2011 | Bugosh et al. |
| 2012/0065011 A1 | 3/2012 | Kvasnicka et al. |
| 2014/0090921 A1 | 4/2014 | Shavrnoch et al. |

FOREIGN PATENT DOCUMENTS

| | | |
|---|---|---|
| DE | 102007049114 A1 | 4/2009 |
| DE | 102009046386 A1 | 5/2011 |
| DE | 102010003105 A1 | 9/2011 |
| DE | 102010054134 B3 | 4/2012 |
| WO | 2011115691 A2 | 9/2011 |
| WO | 2011117099 A1 | 9/2011 |

OTHER PUBLICATIONS

EP Search Report regarding related EP Application No. 13186625.3-1755; dated Jan. 27, 2014; 7 pages.

\* cited by examiner

NYLON RESIN DRIVEN PULLEY

CROSS-REFERENCES TO RELATED APPLICATIONS

This patent application is a divisional application of, and claims priority to, U.S. patent application Ser. No. 15/465,817, filed on Mar. 22, 2017, which is a divisional application of, and claims priority to, U.S. patent application Ser. No. 14/038,976, filed on Sep. 27, 2013, which claims priority to U.S. Provisional Patent Application Ser. No. 61/707,117, filed Sep. 28, 2012, each of which are incorporated herein by reference in their entirety.

BACKGROUND OF THE INVENTION

The following description relates to a torque transmitting assembly, and in particular, a pulley and ball nut of a motor.

A torque transmitted from an electric motor by a belt is typically done via a steel driven pulley attached to a ball nut with several screw fasteners. The screw fasteners may be received through the steel driven pulley and received in threaded or tapped bores of the ball nut. However, machining features such as threaded or tapped holes into the ball nut and machining mating features into the steel pulley are costly.

In addition, the driven pulley is assembled to the ball nut by driving the fasteners through the driven pulley hub and into the ball nut. Sufficient processing time is required to assemble the driven pulley to the ball nut using this process. Further, another aspect of the ball nut assembly process involves assembling a centering ring onto the ball nut. The centering ring has a dual function: to concentrically locate the driven pulley on the ball nut and to retain ball returns of the ball nut within the ball nut.

Accordingly, it is desirable to provide a pulley and ball nut assembly which reduces or eliminates the machining expenses, assembly processes and parts described above.

SUMMARY OF THE INVENTION

According to one aspect of the disclosure, a method of fabricating a ball nut assembly is provided. The method includes providing a ball nut having a keyway slot. The method also includes forming a polymer pulley having an inner surface defining a bore, a cut-out formed in the inner surface, and a torque member extending radially inward from the inner surface, wherein the keyway slot is configured to receive the torque member therein.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
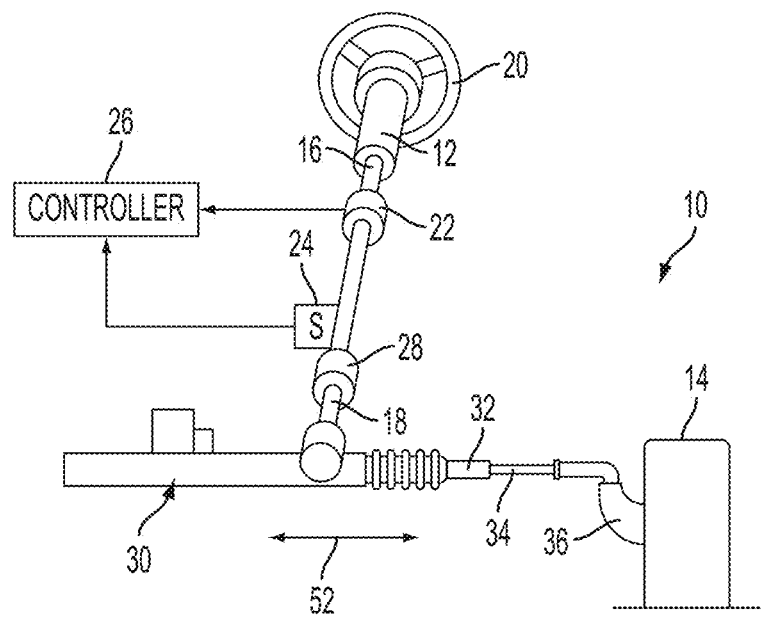
FIG. 1 is a schematic illustration of a steering system according to an exemplary embodiment of the present invention.
Figure 2:
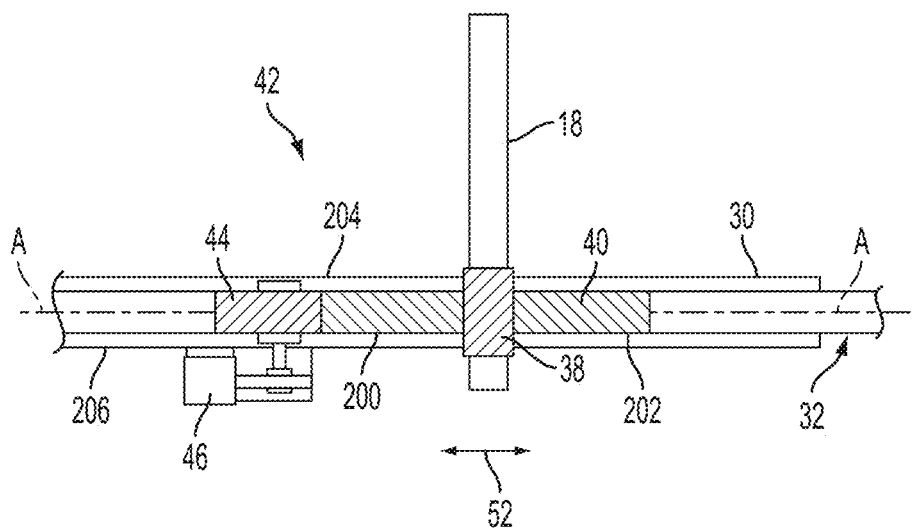
FIG. 2 is a schematic illustration of a portion of the steering system shown in FIG. 1.

Referring now to the Figures, where the invention will be described with reference to specific embodiments, without limiting same, FIGS. 1 and 2 show a steering system 10 for use in a vehicle (not shown). Steering system 10 allows the operator of the vehicle to control the direction of the vehicle through the manipulation of a steering column 12, which is mechanically connected to road wheels 14 (only one shown).

Steering column 12 includes an upper steering shaft 16 and a lower steering shaft 18. A hand wheel 20 is disposed at upper steering shaft 16 and is positioned so that the operator can apply a rotational force to steering column 12. A torque sensor 22 and a position sensor 24 are located at upper steering column shaft 16 to detect the turning angle of hand wheel 20. In the exemplary embodiment, torque sensor 22 and position sensor 24 are in electronic communication with a controller 26. A column universal joint 28 couples upper steering column shaft 16 to lower steering column shaft 18, which is secured at one end to column universal joint 28, and to a steering gear assembly 30 at the other end. Gear assembly 30 includes an elongate rack 32 having longitudinal axis A along which it linearly translates. The opposed axial ends of rack 32 are coupled to the vehicle's road wheels 14 through steering linkage that includes tie rods 34 (only one shown) each secured to rack 32 at one end, and to one of a pair of steering knuckles 36 (only one shown) at the other end.

Steering gear assembly 30 further includes a pinion gear 38 in mechanical connection with rack 32. Pinion gear 38 is positioned to make contact with a matching toothed portion 40 of rack 32 that extends along a segment of rack 32. Pinion gear 38 has teeth that are engaged with teeth of matching toothed portion 40. Pinion gear 38, in combination with matching toothed portion 40, form a rack and pinion gear set 42. Rack 32 also includes an axially extending segment along which is provided generally cylindrical ball screw portion 44 centered about axis A. Toothed portion 40 and a ball screw portion 44 are integrated into rack 32, and ball screw 44 is in mechanical communication with a reversible servomotor 46. Ball screw 44 and motor 46 may be located axially along rack 32 on either first side 200 or opposite second side 202 of toothed portion 40. In addition, motor 46 may be located radially either on top side 204 or bottom side 206 of rack 32. Actuation of motor 46 is controlled by controller 26.

When the vehicle operator turns hand wheel 20, a rotational force is applied to steering column 12 and pinion gear 38 is accordingly rotated. The movement of pinion gear 38 causes axial movement of rack 32 in the direction of arrows 52, which in turn manipulates tie rods 34 and knuckles 36 in order to reposition road wheels 14. Accordingly, when hand wheel 20 is turned, pinion gear 38 and matching tooth portion 40 convert rotary motion of hand wheel 20 into linear motion of rack 32. In order to assist the operator-applied force to steering system 10, motor 46 is energized and provides power assist to the movement of rack 32 through ball screw 44, thereby aiding in the steering of the vehicle.

Figure 3:
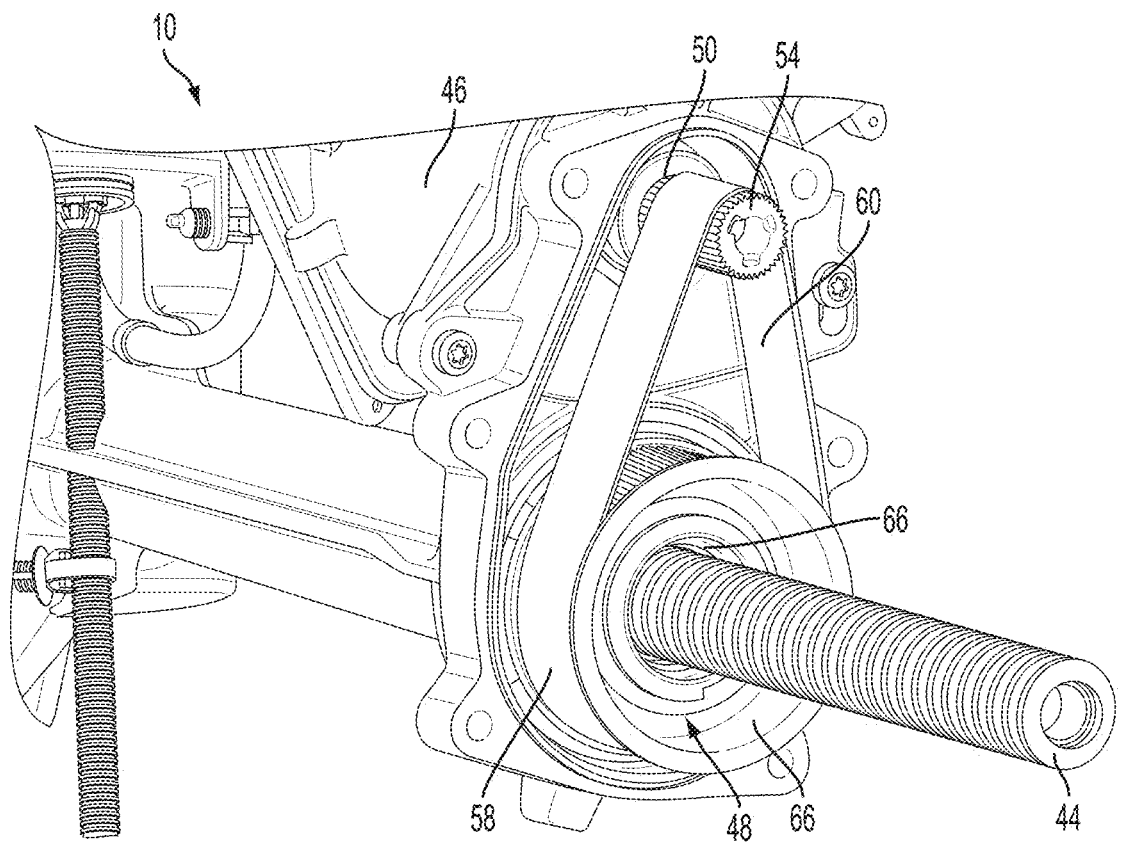
FIG. 3 is a perspective view of a portion of the exemplary steering system.

Referring to FIG. 3, motor 46 is in operable communication with ball screw 44 through a ball nut assembly 48 rotatably disposed about ball screw 44. A shaft 50 extends from motor 46 substantially in parallel with rack 32, and is rotated in one of two opposite angular direction when motor 46 is energized. A driving pulley 54 is rotatably fixed to shaft 50. A flexible, endless drive belt 58 is wrapped around driving pulley 54 such that a belt inner surface 60 is in frictional contact with pulley 54. Belt 58 also wraps around a driven pulley 62 defining the outer circumference of ball nut assembly 48 such that belt inner surface 60 is in frictional contact with driven pulley 62. Driven pulley 62 defines a central axis C about which it is radially centered and includes the radially outer surface of a generally cylindrical ball nut 66. When motor 46 is actuated, movement of belt 58 linking pulleys 54 and 62 causes ball nut 66 to rotate about central axis C and ball screw 44.

Figure 4:
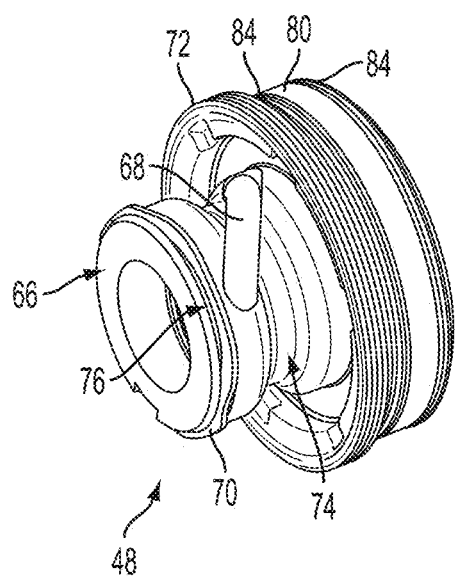
FIG. 4 is a perspective view of an exemplary ball nut assembly of the system shown in FIG. 3.
Figure 5:
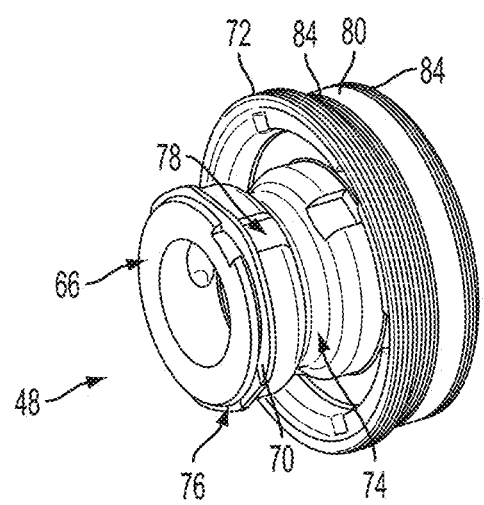
FIG. 5 is a perspective view of the ball nut assembly shown in FIG. 4 and rotated approximately 180 degrees.

As shown in FIGS. 4 and 5, ball nut assembly 48 includes ball nut 66, a ball guide 68, a retainer 70, and a retaining nut 72. Ball nut 66 includes a first groove 74 to receive at least a portion of ball guide 68, a second groove 76 to receive at least a portion of retainer 70, and a keyway slot 78 configured to receive at least a portion of driven pulley 62, as is described herein in more detail. Ball guide 68 recirculates balls located in ball grooves (not shown) formed between ball screw 44 and ball nut 66.

Figure 8:
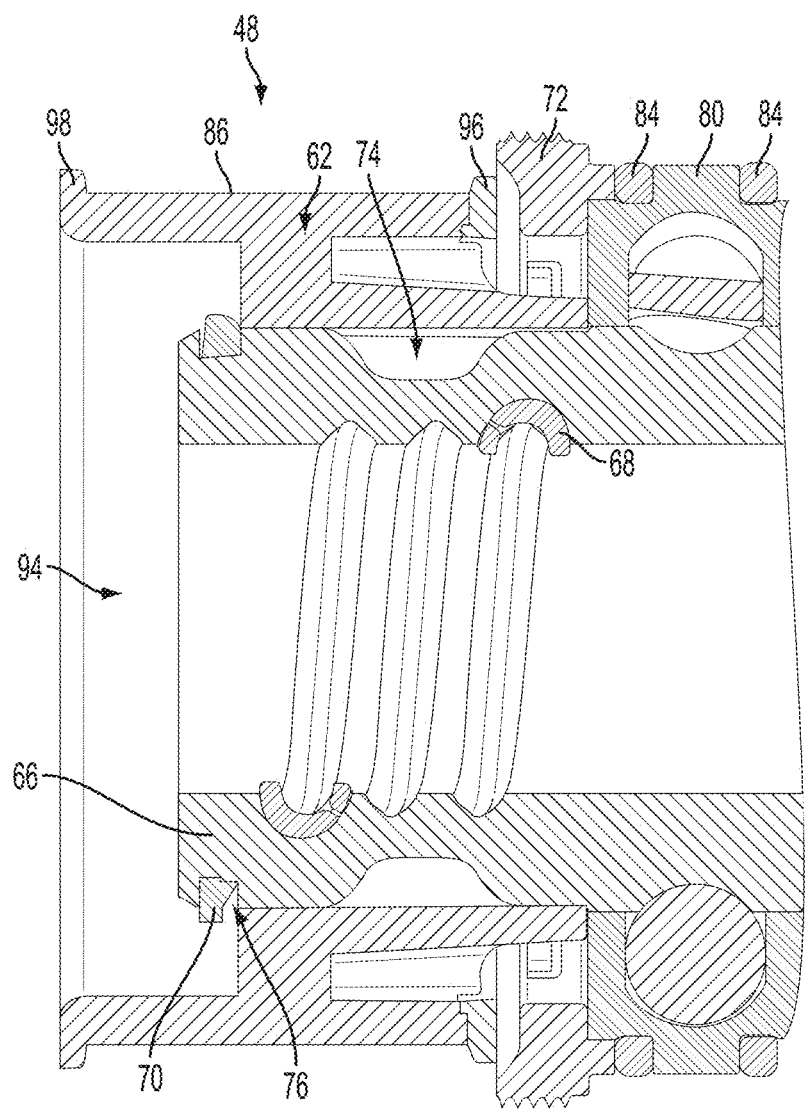
FIG. 8 is a cross-sectional view of the assembly shown in FIG. 7 and taken along line 8-8.

In the exemplary embodiment, retainer 70 is a biasing member and is located in groove 76 to facilitate preloading driven pulley 62 to press against a ball screw bearing 80 (see FIG. 8). Retaining nut 72 is threaded into the steering system housing and abuts against bearing 80 to form a groove 82 therebetween. An elastomeric isolator member or O-ring 84 is positioned within groove 82 (see FIG. 8).

Figure 6:
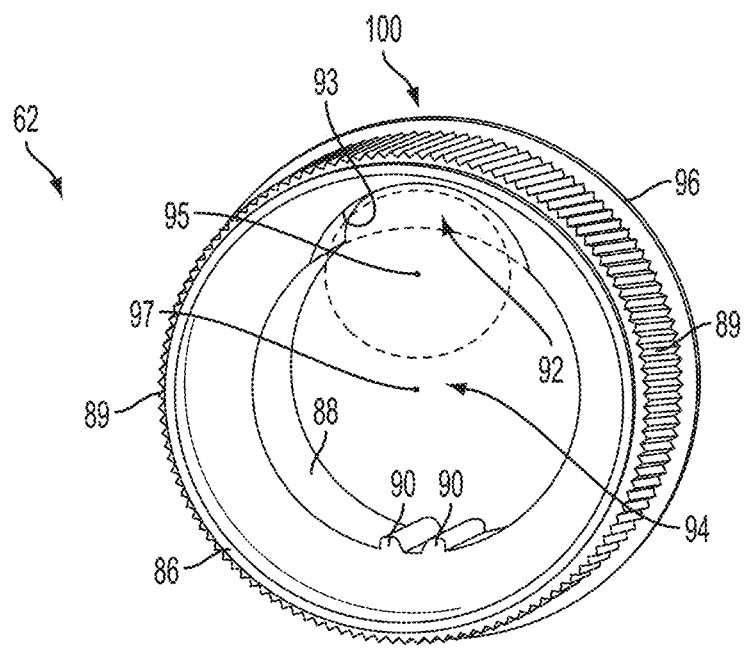
FIG. 6 is a perspective view of an exemplary driven pulley of the system shown in FIG. 3.
Figure 7:
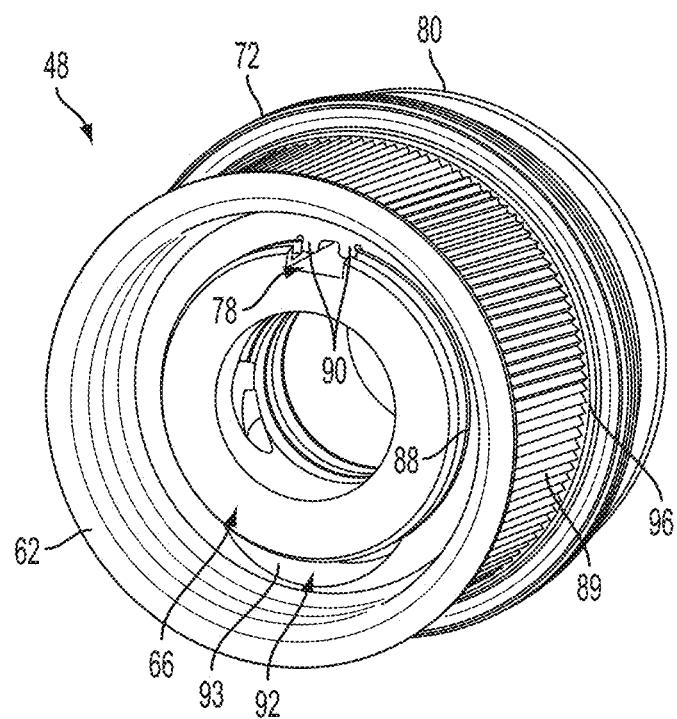
FIG. 7 is a perspective view of the driven pulley shown in FIG. 6 after being assembled onto the ball nut assembly shown in FIGS. 3 and 4.

FIG. 6 is a perspective view of driven pulley 62, and FIGS. 7 and 8 illustrate driven pulley 62 assembled onto ball nut 66. In the exemplary embodiment, driven pulley 62 is positioned on ball nut 66 and concentrically locates itself by being pressed onto an outer diameter of ball nut 66. Retainer 70 and/or retaining nut 72 facilitate locating pulley 62 onto ball nut 66. However, it is understood that other locating mechanisms may be used in addition to, or in place of, the mechanisms described above.

In the exemplary embodiment, pulley 62 is a generally cylindrical shape and includes an outer surface 86 and an inner surface 88. Outer surface includes a plurality of teeth 89 circumferentially spaced from each other to engage belt 58, and inner surface 88 is a generally smooth bore surface that includes at least one torque member 90 extending radially inward therefrom. Although two torque members 90 are illustrated in FIGS. 6 and 7, pulley 62 may have any number of torque members 90 that enables system 10 to function as described herein. For example, pulley 62 may have only one torque member. Torque member 90 is configured to extend into keyway slot 78 to facilitate transferring torque between ball nut 66 and driven pulley 62. Further, pulley 62 includes a cut-out 92 formed in a portion 93 of inner surface 88, which is shaped and configured to provide proper clearance for ball guide 68 when inserting pulley 62 onto ball nut 66. Cut-out 92 is also shaped and configured to provide proper interference and retention of ball guide 68. Moreover, in the embodiment shown, cut-out 92 includes a centerpoint 95 and has a radius that is smaller than a radius of bore 94 defined by inner surface 88 and a centerpoint 97.

Driven pulley 62 may be made from, for example, a polymer, including polyamides such as nylon resin. In an exemplary embodiment, pulley 62 is fabricated from glass filled nylon. It is understood that these examples are non-exhaustive and non-limiting. Other suitable materials are envisioned as well for the construction of pulley 62. For example, other compressible materials, which may be pressed onto ball nut 66, may be suitable for the pulley 62. Moreover, in the exemplary embodiment, a flange 96 is coupled to driven pulley to complement a second flange 98 such that belt 58 is at least partially contained between flanges 96 and 98. Flange 96 may be fabricated from the same material as pulley 62 or may be fabricated from any suitable different material. Further, flange 96 may be coupled to pulley 62 by any suitable process (e.g., sonic welding). Alternatively, flange 96 may be formed integrally with driven pulley 62.

Figure 9:
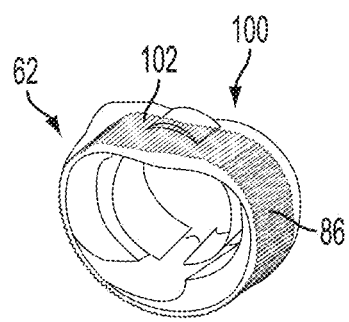
FIG. 9 is a perspective view of the driven pulley shown in FIG. 6 after being pressed onto the ball nut assembly.

Referring to FIG. 9, in one exemplary embodiment, a section 100 of driven pulley 62 deforms when pulley 62 is pressed onto ball nut 66. In the exemplary embodiment, the deformation results in a substantially flat portion 102 along pulley outer surface 86 in the region of section 100. It is understood that the "substantially flat portion" refers to a portion that may present a flat or un-curved shape, or may be a portion that is deformed so that a radius of curvature is increased in that region.

Power assist steering system 10 illustrated in FIGS. 1 and 2, includes a mechanical connection, via rack and pinion gear set 42, between hand wheel 20 and rack 32. In alternative "steer-by-wire" systems there is no such direct mechanical connection between hand wheel 20 and rack 32. In such systems, similarly sensed rotational movement of hand wheel 20 by the driver (and/or a signal form an equivalent driver control device) is input into controller 26 while motor 46 provides the necessary force to manipulate rack 32. Thus, the system described herein may be similarly utilized in steer-by-wire systems. In addition, it is also important to note that while the features herein have been described as being incorporated into a steering system, such features can be beneficially incorporated into any mechanism that can utilize a ball screw assembly.

A method of fabricating a ball nut assembly is provided. The method includes forming ball nut 66 with ball guide 68, first groove 68, second groove 70, and keyway slot 78. Grooves 68 and 70 and keyway slot 78 may be machined in a separate process. The method further includes forming driven pulley 62 from a polymer such as nylon resin. Pulley 62 is formed with teeth 89 on outer surface 86, cut-out 92, and at least one torque member 90 extending radially into bore 94 from inner surface 88. Retainer 70 may be pressed into second groove 70, and pulley 62 is assembled onto ball nut 66 such that torque member 90 is inserted into keyway slot 78 and cut-out 92 slides over ball guide 68. Section 100 may then be pressed such that section 100 deforms and produces flat portion 102 and secures pulley 62 to ball nut 66.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A method of fabricating a ball nut assembly, the method comprising:
   providing a ball nut having a keyway slot;
   forming a polymer pulley having an inner surface defining a bore, a cut-out formed in the inner surface, and a torque member extending radially inward from the inner surface, wherein the keyway slot is configured to receive the torque member therein;
   inserting the polymer pulley onto the ball nut such that the torque member is at least partially within the keyway slot; and
   deforming a portion of the polymer pulley proximate the cut-out to define a generally flat portion of the pulley.

2. The method of claim 1, wherein forming the polymer pulley further comprises fabricating the pulley from nylon resin.

3. The method of claim 1, further comprising forming a groove on an end of the ball nut and inserting a retainer into the groove.

4. The method of claim 1, further comprising forming a flange and coupling the flange to the polymer pulley.

* * * * *